United States Patent
Itoi et al.

(10) Patent No.: US 11,125,722 B2
(45) Date of Patent: Sep. 21, 2021

(54) METHOD AND APPARATUS FOR EVALUATING DAMAGE TO MAGNETIC LINEAR BODY

(71) Applicant: TOKYO ROPE MANUFACTURING CO., LTD., Tokyo (JP)

(72) Inventors: Hiroaki Itoi, Tokyo (JP); Sadanori Shiiki, Tokyo (JP); Masamichi Sugahara, Tokyo (JP); Toshiyuki Moriya, Tokyo (JP)

(73) Assignee: TOKYO ROPE MANUFACTURING CO., LTD., Tokyo (JP)

( * ) Notice: Subject to any disclaimer, the term of this patent is extended or adjusted under 35 U.S.C. 154(b) by 187 days.

(21) Appl. No.: 16/439,756

(22) Filed: Jun. 13, 2019

(65) Prior Publication Data
US 2019/0293603 A1  Sep. 26, 2019

Related U.S. Application Data

(63) Continuation of application No. PCT/JP2016/087019, filed on Dec. 13, 2016.

(51) Int. Cl.
*G01N 27/83* (2006.01)
*D07B 7/16* (2006.01)

(52) U.S. Cl.
CPC .............. *G01N 27/83* (2013.01); *D07B 7/16* (2013.01)

(58) Field of Classification Search
CPC .......... G01N 27/83; D07B 7/16; D07B 1/145; D07B 2301/555
USPC ........................................................ 324/240
See application file for complete search history.

(56) References Cited

U.S. PATENT DOCUMENTS

| | | | | |
|---|---|---|---|---|
| 4,827,215 A | * | 5/1989 | van der Walt | G01N 27/82 324/227 |
| 5,321,356 A | * | 6/1994 | Weischedel | G01N 27/82 324/262 |
| 2003/0042897 A1 | * | 3/2003 | Wolodko | G01N 27/82 324/240 |
| 2007/0090834 A1 | * | 4/2007 | Osada | B66B 7/123 324/240 |

(Continued)

FOREIGN PATENT DOCUMENTS

| | | |
|---|---|---|
| JP | H02257055 A | 10/1990 |
| JP | H0687861 U | 12/1994 |

(Continued)

OTHER PUBLICATIONS

Osamu et al (Translation of JP #2556957) (Year: 1997).*

(Continued)

*Primary Examiner* — Christopher P McAndrew
(74) *Attorney, Agent, or Firm* — Dickinson Wright PLLC (57) ABSTRACT

A magnetic detector includes permanent magnets that magnetize a wire rope W in the longitudinal direction, and a search coil that detects a change in the cross sectional area of the wire rope W magnetized by the permanent magnets. The magnetic detector is provided so as to surround a part of the wire rope W. Prior to inspection, the magnetic detector is moved back and forth at least three times across an inspection range of the wire rope W. After the magnetic detector is moved back and forth, the change in the cross sectional area, that is, damage to the wire rope W is inspected by using signals outputted from the search coil.

3 Claims, 9 Drawing Sheets

(56) References Cited

U.S. PATENT DOCUMENTS

| | | | | |
|---|---|---|---|---|
| 2008/0106260 A1* | 5/2008 | Rogers | ................... | G01N 27/83 324/240 |
| 2014/0035569 A1* | 2/2014 | Yoshioka | ............... | G01N 27/82 324/242 |
| 2019/0293604 A1* | 9/2019 | Seavey | ................ | G01N 27/902 |

FOREIGN PATENT DOCUMENTS

| JP | H07505468 A | 6/1995 |
|---|---|---|
| JP | 2000019160 A | 1/2000 |
| JP | 2000055885 A | 2/2000 |
| JP | 2002005896 A | 1/2002 |
| JP | 2002156363 A | 5/2002 |
| JP | 3734822 B1 | 1/2006 |
| JP | 2008002826 A | 1/2008 |
| JP | 2010014659 A | 1/2010 |

OTHER PUBLICATIONS

Deng, Zhiyang, et al. "Effects of surface roughness on magnetic flux leakage testing of micro-cracks." Measurement Science and Technology 28.4 (2017): 045003. (Year: 2017).*

Korean Intellectual Property Office Notice of Preliminary Rejection for KR Patent Application Serial No. 10-2019-7019985; dated Oct. 3, 2020; 4 pgs.; English Language Translation 3 pgs.

* cited by examiner

METHOD AND APPARATUS FOR EVALUATING DAMAGE TO MAGNETIC LINEAR BODY

CROSS REFERENCE TO RELATED APPLICATIONS

This application is a Continuation Application of PCT International Application No. PCT/JP2016/087019 filed on Dec. 13, 2016, the entire disclosure of the application being considered part of the disclosure of this application and hereby incorporated by reference.

TECHNICAL FIELD

The present invention relates to a damage detection method of a wire rope, and a signal processor and a damage detection device used for damage detection of a wire rope.

BACKGROUND ART

Japanese Patent Application (Laid-Open No. 2002-5896) discloses an inspection device that inspects a wire rope by using the magnetic flux leakage method.

In the magnetic flux leakage method, a wire rope is magnetized in the longitudinal direction by using magnets of the inspection device, and magnetic flux leaked from a damaged part of the wire rope is detected. An elongated magnetic body such as a wire rope may be magnetized due to an influence of earth magnetism during or after manufacture, and magnetic poles may be originally formed in both end portions of the wire rope. Therefore, when magnetic force of the magnets provided in the inspection device is weak, the magnetizing directions (magnetic axes) of the wire rope in an inspection range are not uniform due to an influence of the magnetic poles of both the end portions of the wire rope. As a result, output signals of the inspection device, in particular, output signals of both end parts of the inspection range may be unstable (S/N ratio may be deteriorated). By using magnets having strong magnetic force, it is possible to make the magnetizing directions of the inspection range uniform to some extent. However, since magnets having strong magnetic force are heavy, the inspection device is less easily conveyed.

DISCLOSURE OF THE INVENTION

An object of the present invention is to make the magnetizing directions of an inspection range of a wire rope uniform.

A further object of the present invention is to improve the S/N ratio of signals outputted from a damage detection device of a wire rope.

Further, an object of the present invention is to equally magnetize a wire rope over the entire circumference, and to prevent damage to the wire rope at the time of inspection A damage detection method of a wire rope according to the present invention is a damage detection method of a wire rope using a portable damage detection device which is provided so as to surround a part of the wire rope in the longitudinal direction over the entire circumference, the portable damage detection device including a magnetizing device (means) that magnetizes the wire rope in the longitudinal direction, and a search coil that detects a change in the cross sectional area of the wire rope in an inspection range magnetized by the magnetizing device, the damage detection method being characterized by including moving the damage detection device back and forth on the wire rope the predetermined number of times across the inspection range of predetermined length of the wire rope, and after the damage detection device is moved back and forth the predetermined number of times, recording signals outputted from the search coil.

According to the present invention, prior to inspection of the wire rope using the damage detection device, the damage detection device is moved back and forth the predetermined number of times across the inspection range of the predetermined length of the wire rope. Thereby, it is possible to align the magnetizing directions (magnetic axes) in the inspection range of the wire rope. By moving the damage detection device back and forth in the inspection range, there is no large divergence between output signals from the search coil in an outbound move and output signals from the search coil in a return move. It is possible to align the magnetizing directions (magnetic axes) in the inspection range, and improvement of inspection precision is realized.

Preferably, the damage detection device is moved until the damage detection device exceeds both ends of the inspection range of the predetermined length of the wire rope. It is possible to align the magnetizing directions of the entire inspection range.

In an aspect, the damage detection device is moved back and forth at least three times. It is possible to obtain stable output signals.

It is possible to set (adjust) length of the inspection range arbitrarily. In a case where the wire rope is longer than the inspection range, it is possible to inspect the wire rope over the entire length thereof by gradually displacing the inspection range. Every time the inspection range is displaced, by moving the damage detection device back and forth across a new inspection range prior to inspection of the new inspection range, it is possible to inspect the wire rope over the entire length with good precision.

The present invention also provides a signal processor suitable for damage detection of the wire rope described above. The signal processor according to the present invention includes a voltage signal receiving device (means) that receives an input of voltage signals corresponding to the change in the cross sectional area of a wire rope, the voltage signals outputted from a search coil of a portable damage detection device which is provided so as to surround a part of the wire rope in the longitudinal direction over the entire circumference, the portable damage detection device including a magnetizing device (means) that magnetizes the wire rope in the longitudinal direction, and the search coil that detects a change in the cross sectional area of the wire rope in an inspection range magnetized by the magnetizing device (means), a converting device (means) that converts the voltage signals received by the voltage signal receiving device into magnetic flux signals, a smoothing device (means) that smooths the magnetic flux signals converted by the converting device and calculates smoothed magnetic flux signals, and a subtracting device (means) that subtracts the smoothed magnetic flux signals from the magnetic flux signals.

The present invention also provides a method suitable for controlling the signal processor described above. The signal processing method according to the present invention includes receiving, by a voltage signal receiving device (means), an input of voltage signals corresponding to the change in the cross sectional area of a wire rope, the voltage signals outputted from a search coil of a portable damage detection device which is provided so as to surround a part of a wire rope in the longitudinal direction over the entire circumference, the portable damage detection device including a magnetizing device (means) that magnetizes the wire rope in the longitudinal direction, and the search coil that detects a change in the cross sectional area of the wire rope in an inspection range magnetized by the magnetizing device, converting the received voltage signals into magnetic flux signals by a converting device (means), calculating smoothed magnetic flux signals by smoothing the converted magnetic flux signals by a smoothing device (means) and subtracting the smoothed magnetic flux signals from the magnetic flux signals by a subtracting device (means).

When the magnetic poles are originally formed in both the end portions of the wire rope due to an influence of earth magnetism during or after manufacture, output signals (voltage signals or magnetic flux signals) in particular, in both end parts of the inspection range may be influenced by the magnetic poles in both the end portions of the wire rope. According to the present invention, by subtracting the smoothed magnetic flux signals by smoothing the magnetic flux signals from the magnetic flux signals, it is possible to cancel or reduce an amount of influence of the magnetic poles in both the end portions of the wire rope included in the output signals in both the end parts of the inspection range. Since the S/N ratio of the output signals is improved, it is possible to more accurately detect occurrence of damage to the wire rope, and a degree and an occurrence place of the damage.

For example, the moving average method can be used for the smoothing device. The moving average method may use simple moving average or weighted moving average. As a matter of course, both the simple moving average and the weighted moving average can be used.

The present invention also provides a portable damage detection device including a moving mechanism suitable for damage detection of the wire rope described above. The portable damage detection device including the moving mechanism according to the present invention includes a portable damage detection device including a magnetizing device (means) which has a columnar internal space through which a wire rope passes, the internal space having a diameter larger than a diameter of the wire rope, the magnetizing device that magnetizes the wire rope in the longitudinal direction, the magnetizing device being arranged in an annular shape, and a search coil that detects a change in the cross sectional area of the wire rope in an inspection range magnetized by the magnetizing device, the search coil being arranged in an annular shape, and a moving mechanism including rotatable support rollers respectively attached to both end portions of the portable damage detection device at equal angle intervals, the support rollers that support the wire rope from four directions around the wire rope at both the end portions, and the respective support rollers in both the end portions of the portable damage detection device are attached in such a manner that the cross sectional center of the wire rope matches with the cross sectional center of the internal space.

Since the wire rope passes through the center of the internal space of the portable damage detection device, a distance between the wire rope and the magnetizing device arranged in an annular shape becomes equal over the entire circumference, and it is possible to equally magnetize the wire rope over the entire circumference. Further, since the wire rope is not brought into contact with an inner peripheral surface of the internal space of the damage detection device, damage due to contact between the wire rope and the damage detection device does not occur. It is possible to smoothly move the portable damage detection device along the longitudinal direction of the wire rope

DETAILED DESCRIPTION OF THE INVENTION

Figure 1:
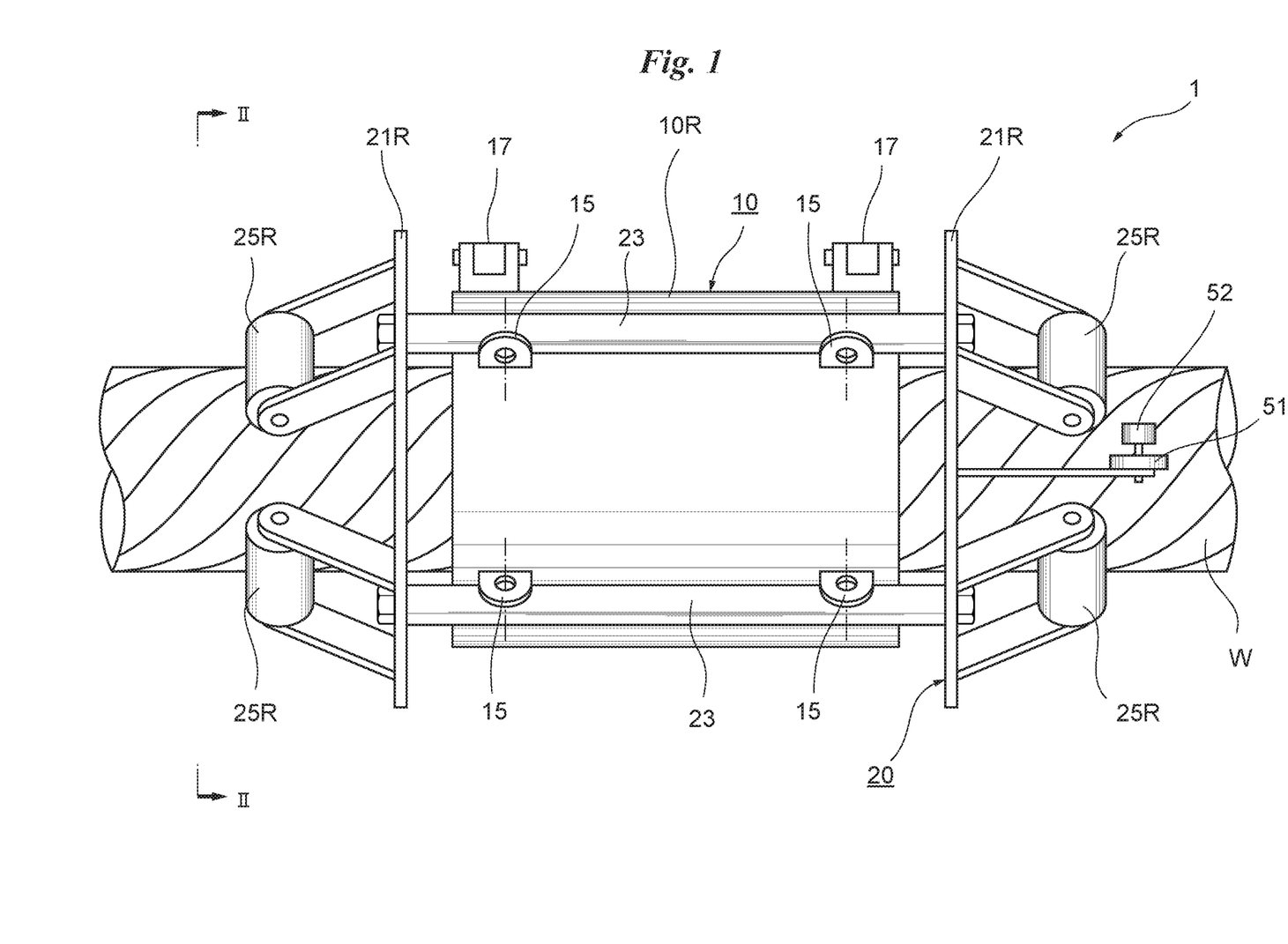
FIG. 1 is a front view of a portable wire rope damage detection device.
Figure 2:
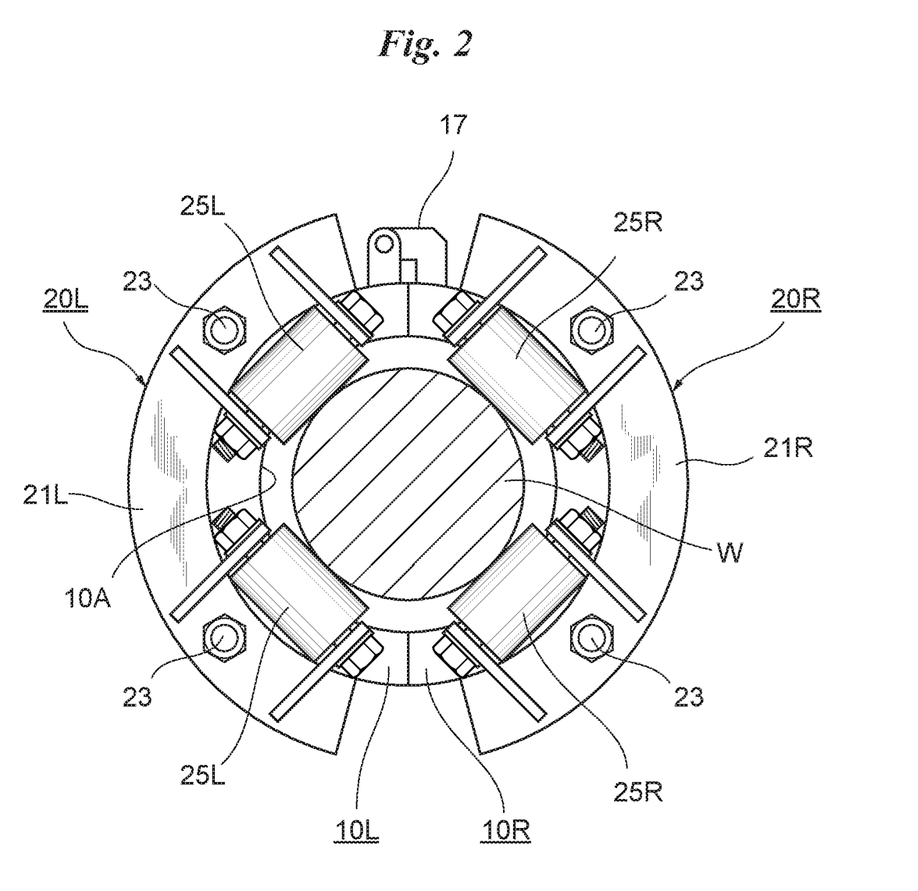
FIG. 2 is a side view of the portable wire rope damage detection device along the line II-II of FIG. 1.

FIG. 1 is a front view of a portable wire rope damage detection device. FIG. 2 is a side view of the portable wire rope damage detection device along the line II-II of FIG. 1.

A portable wire rope damage detection device 1 includes a magnetic detector 10, and a moving mechanism 20 for moving the magnetic detector 10 along a wire rope W.

The magnetic detector 10 is formed in a cylindrical shape, and includes a columnar internal space 10A through which the wire rope W passes, the internal space having a diameter larger than a diameter of the wire rope W. The magnetic detector 10 includes a pair of openable/closable half-cylindrical bodies 10L, 10R coupled at two hinges 17 which are provided and spaced from each other in the front and back direction (cylindrical axis direction), and the half-cylindrical bodies 10L, 10R can be opened to both sides on the hinges 17. By enclosing (embracing) the wire rope W from both the sides by the two half-cylindrical bodies 10L, 10R, the magnetic detector 10 is attached to the wire rope W. Hereinafter, for convenience of description, one end of the magnetic detector 10 in the front and back direction (cylindrical axis direction) (left end in FIG. 1) will be called as one end portion, and the other end (right end in FIG. 1) will be called as the other end portion.

The moving mechanism 20 includes a pair of moving mechanisms 20L, 20R respectively attached to the half-cylindrical bodies 10L, 10R (see FIG. 2).

The moving mechanisms 20L, 20R are made symmetrically in the front and back direction (see FIG. 1), and also made symmetrically in the left and right direction (see FIG. 2). On an outer surface of each of the half-cylindrical bodies 10L, 10R, four semi-circular fins 15 projecting outward are fixed and spaced from each other in the front and back direction and in the circumferential direction. A screw hole is formed in each of the fins 15, and a bar 23 extending in the front and back direction is attached to one pair of fins 15 aligned in the front and back direction. With reference to FIG. 2, when the portable wire rope damage detection device 1 is seen from the side, four bars 23 are attached at positions corresponding to four corners around the cylindrical magnetic detector 10.

Fan-shaped plates 21L, 21R are fixed to each of both ends of the two bars 23 aligned in the up and down direction when seen from side. Two rotatable support rollers 25L are fixed to an outer surface of the fan-shaped plate 21L via support members and spaced from each other, and two rotatable support rollers 25R are fixed to an outer surface of the fan-shaped plate 21R via support members and spaced from each other. In the one end portion, four support rollers 25L, 25R are provided at equal angle intervals when seen from the side, and in the other end portion, four support rollers 25L, 25R are also provided at equal angle intervals when seen from the side. An inscribed circle of four support rollers 25L, 25R provided in each of the one end portion and the other end portion has the same diameter as the diameter of the wire rope W, and the inscribed circle of the support rollers 25L, 25R is a concentric circle to a circular cross section of the wire rope W.

The wire rope W passing through the internal space 10A of the magnetic detector 10 is supported from four directions around the wire rope. As described above, four support rollers 25L, 25R provided in each of the one end portion and the other end portion are provided in such a manner that the inscribed circle of the support rollers 25L, 25R has the same diameter as the diameter of the wire rope W and the inscribed circle of the support rollers 25L, 25R is the concentric circle to the circular cross section of the wire rope W. That is, in each of the one end portion and the other end portion of the portable wire rope damage detection device 1, the wire rope W is supported by four support rollers 25L, 25R in such a manner that the cross sectional center of the wire rope W matches with the cross sectional center of the internal space 10A. Thereby, the wire rope W is positioned on the center of the internal space 10A of the magnetic detector 10. As described later, the magnetic detector 10 includes plural permanent magnets aligned in an annular form inside thereof. Since the wire rope W passes through the center of the internal space 10A of the magnetic detector 10, a distance between the wire rope W and the permanent magnets aligned in an annular form becomes equal over the entire circumference, and it is possible to equally magnetize the wire rope W over the entire circumference. Further, since the wire rope W is not brought into contact with an inner peripheral surface of the internal space 10A of the magnetic detector 10, damage due to contact between the wire rope W and the magnetic detector 10 does not occur. It is possible to smoothly move the magnetic detector 10 along the longitudinal direction of the wire rope W.

For support members of the support rollers 25L, 25R, it is possible to detachably attach support rollers 25L, 25R having different diameters. In a case where a wire rope W having a small diameter is inspected, support rollers 25L, 25R having a large diameter are attached, and in a case where a wire rope W having a large diameter is inspected, support rollers 25L, 25R having a small diameter are attached. Even when the wire rope W has a difference diameter but a smaller diameter than a diameter of a cross section of the internal space 10A of the magnetic detector 10, it is possible to attach the magnetic detector 10, and it is possible to position the wire rope W on the center of the internal space 10A.

With reference to FIG. 1, a support member is fixed to the outer surface of the plate 21R provided on the other end side (right side in FIG. 1), and a roller 51 is attached to a leading end of the support member. The roller 51 is in contact with a front surface of the wire rope W. When the magnetic detector 10 is moved along the wire rope W, the roller 51 is rotated. A rotary encoder 52 is fixed to a rotation shaft of the roller 51, and a moving distance of the magnetic detector 10 (position of the magnetic detector 10) is measured by this rotary encoder 52.

Figure 3:
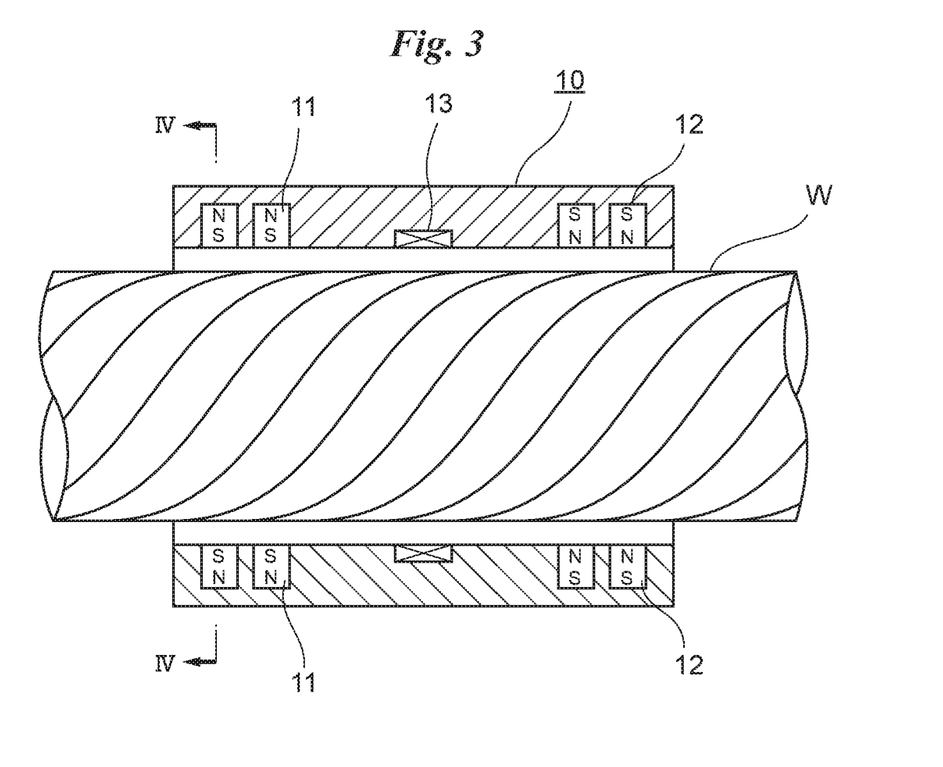
FIG. 3 is a sectional view schematically showing an internal structure of a magnetic detector.
Figure 4:
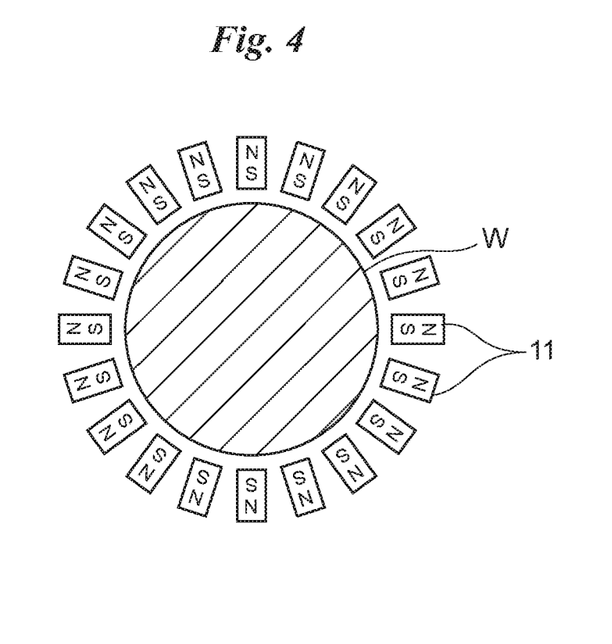
FIG. 4 shows arrangement of permanent magnets.

FIG. 3 is a vertically sectional view schematically showing an internal structure of the magnetic detector 10. FIG. 4 schematically shows a cross sectional view along the line IV-IV of FIG. 3, and shows arrangement of the permanent magnets provided in the magnetic detector 10.

In the magnetic detector 10, two rows of eighteen permanent magnets 11 aligned at equal intervals in an annular form are provided on the one end side (left side in FIG. 3), and two rows of eighteen permanent magnets 12 aligned at equal intervals in an annular form are provided on the other end side (right side in FIG. 3). Any of the permanent magnets 11 on the one end side are arranged in such a manner that an S pole is directed to the center of the magnetic detector 10 and an N pole is directed outward. Any of the permanent magnets 12 on the other end side are arranged in such a manner that an N pole is directed to the center of the magnetic detector 10 and an S pole is directed outward. As described above, the magnetic detector 10 is formed from the pair of half-cylindrical bodies 10L, 10R. Thus, nine of the eighteen permanent magnets 11, 12 aligned in an annular form are provided in the half-cylindrical body 10L on one side, and the remaining nine are provided on the half-cylindrical body 10R on the other side. The number of the permanent magnets 11, 12 can be arbitrarily adjusted. The permanent magnets 11 and 12 may be connected by a yoke (not shown).

An annular search coil 13 is provided in a center part of the magnetic detector 10 in the front and back direction. One search coil 13 may be provided, or two annular search coils 13 may be provided side by side and spaced from each other in the front and back direction and these may be differentially connected. The search coil 13 is formed in an annular shape by connecting connectors (not shown) respectively provided in both ends of the search coil. When the magnetic detector 10 is attached to the wire rope W, both the ends of the connectors are disconnected.

Magnetic flux generated from the permanent magnets 11, 12 forms a magnetic loop passing through the wire rope W, and thereby, the wire rope W is magnetized. When, for example, deterioration progresses and damage is accumulated in the wire rope W, a change (reduction) in the cross sectional area of the wire rope (reduction in the rope diameter) appears in the damaged part (such as a worn part or a corroded part). The magnetic flux passing through the magnetized wire rope W is proportional to the cross sectional area of the wire rope W. Thus, a change in the magnetic flux passing through the wire rope W appears in the damaged part. When the magnetic detector 10 passes through the damaged part of the magnetized (saturation-magnetized) wire rope W, electromotive force is generated in the search coil 13 by a change in magnetic flux interlinked with the search coil 13, and this appears as a peak in output signals of the search coil 13. Based on the output signals of the search coil 13, it is possible to detect the change in the cross sectional area of the wire rope W, that is, the damaged part occurring in the wire rope W.

An elongated magnetic body such as the wire rope W may be magnetized in the longitudinal direction upon receiving an influence of earth magnetism during or after manufacture, and magnetic poles may be originally formed in both end portions of the wire rope W. Only by moving the magnetic detector 10 (permanent magnets 11, 12) once on the wire rope W, it may be difficult to make the magnetizing directions (magnetic axes) of the wire rope W uniform.

Figure 5:
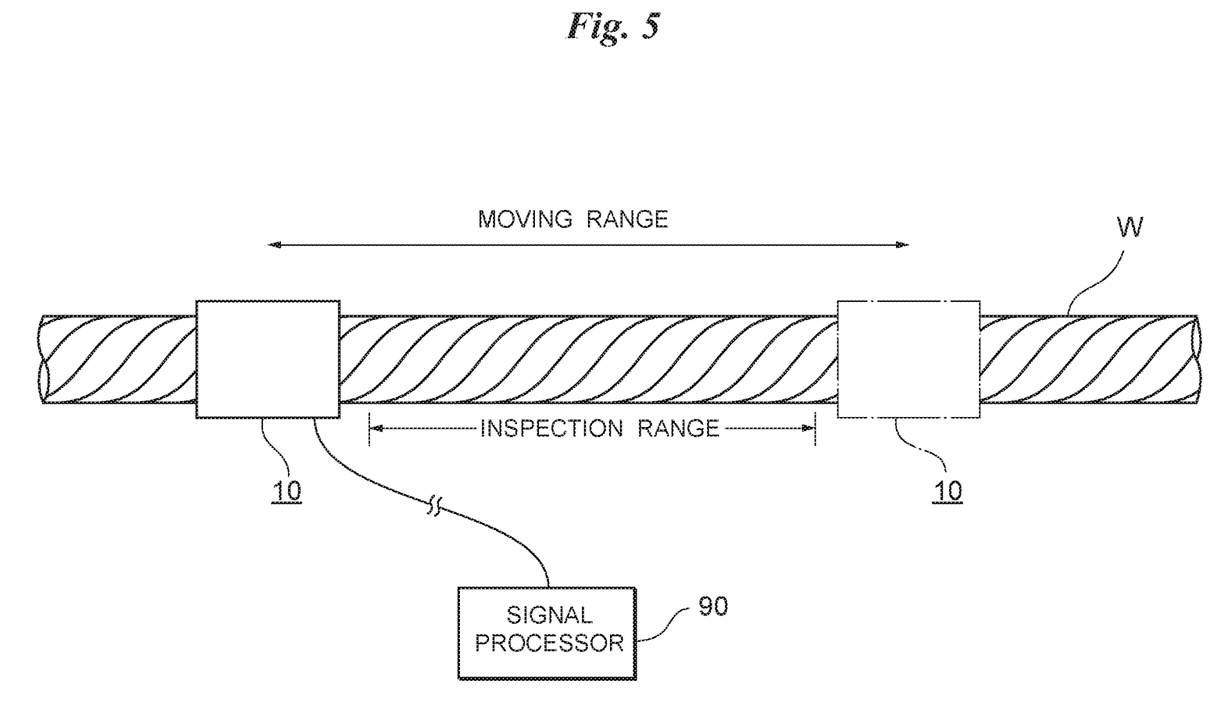
FIG. 5 shows a state where the magnetic detector is being moved in an inspection range of a wire rope.

FIG. 5 schematically shows a state where the magnetic detector 10 is being moved back and forth in an inspection range of predetermined length of the wire rope W. A signal processor 90 is connected to the magnetic detector 10 via a signal cable, and the output signals from the search coil 13 and output signals from the rotary encoder 52 are given to the signal processor 90 via the signal cable. As described later, in order to make the magnetizing directions of the entire inspection range uniform, the magnetic detector 10 is preferably moved until the magnetic detector 10 exceeds both ends of the inspection range.

Figure 6:
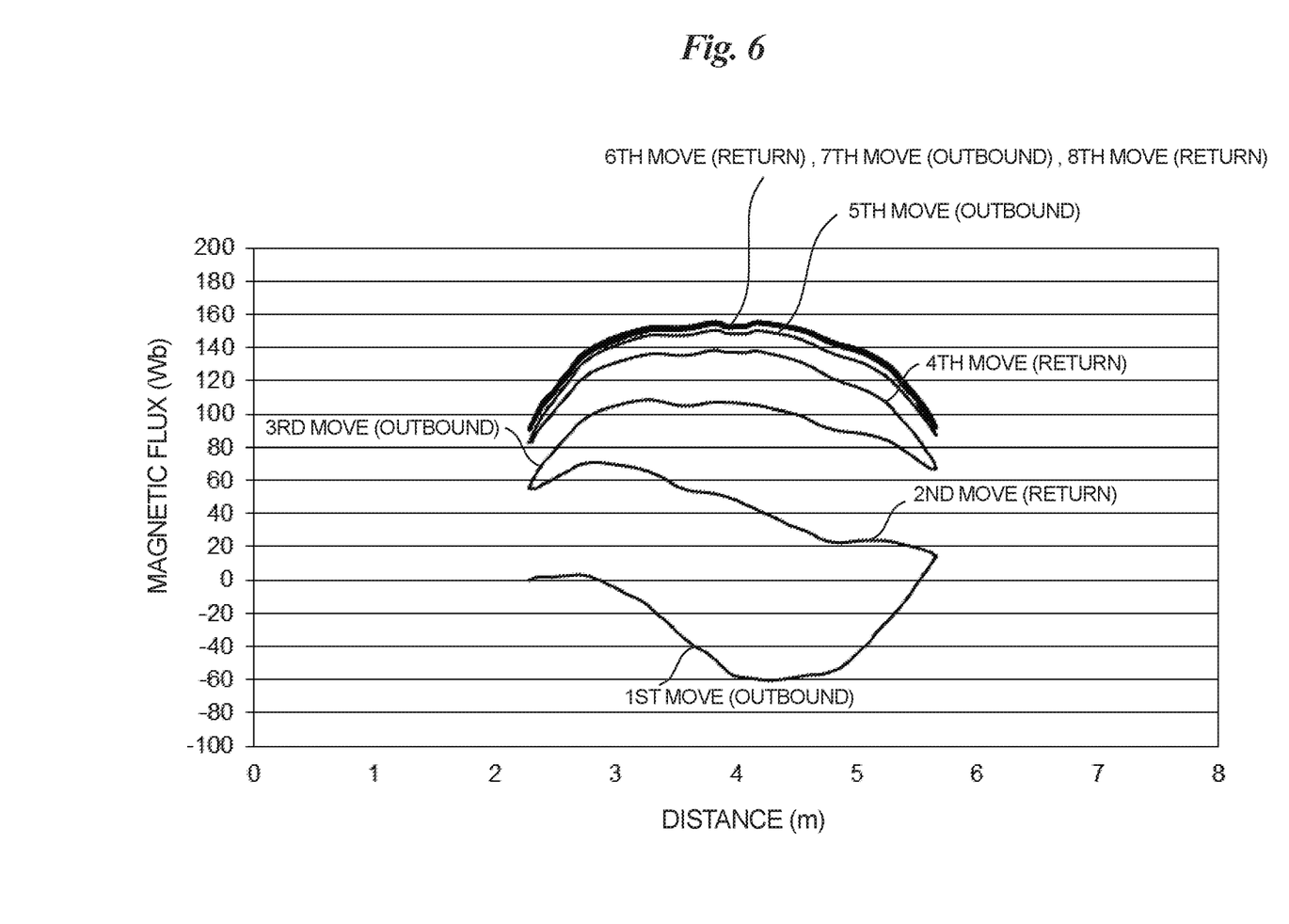
FIG. 6 is a graph showing output signals when the magnetic detector is moved back and forth.

FIG. 6 is a graph showing output signals outputted from the magnetic detector 10 when the magnetic detector 10 is moved consecutively eight times (moved back and forth four times) across the inspection range of the predetermined length. FIG. 6 shows the output signals of the magnetic detector 10 when the magnetic detector 10 is moved back and forth four times across the inspection range of length of about 4 meters. In the graph of FIG. 6, the horizontal axis indicates the distance (position of the magnetic detector 10), and the vertical axis indicates the output signals (magnetic flux (Wb)).

With reference to FIG. 6, regarding the output signals when the magnetic detector 10 is moved back and forth across the inspection range, it is found that a change is large at the beginning (divergence between an outbound move and a return move is large) and force of magnetizing the wire rope W is weak. As back and force movement is repeated, the change becomes smaller (divergence between the outbound move and the return move becomes smaller) and the force of magnetizing also becomes stronger. Upon the sixth move (return), the seventh move (outbound), and the eighth move (return), there is almost no change in the output signals.

That is, by moving the magnetic detector 10 back and forth several times across a predetermined inspection range of the wire rope W, the magnetizing directions (magnetic axes) in the inspection range become uniform, and it is possible to stabilize the output signals.

The number of times the magnetic detector 10 is moved back and forth also depends on magnetic force of the permanent magnets 11, 12 provided in the magnetic detector 10. When permanent magnets having strong magnetic force are used, the output signals can be stabilized by the less number of times the magnetic detector is moved. However, magnets having strong magnetic force are generally heavy and inhibit portability of the magnetic detector 10. In consideration with the portability of the magnetic detector 10, it is proper to use such permanent magnets 11, 12 that stable output signals can be obtained by moving the magnetic detector 10 back and forth three times across the inspection range.

Figure 7:
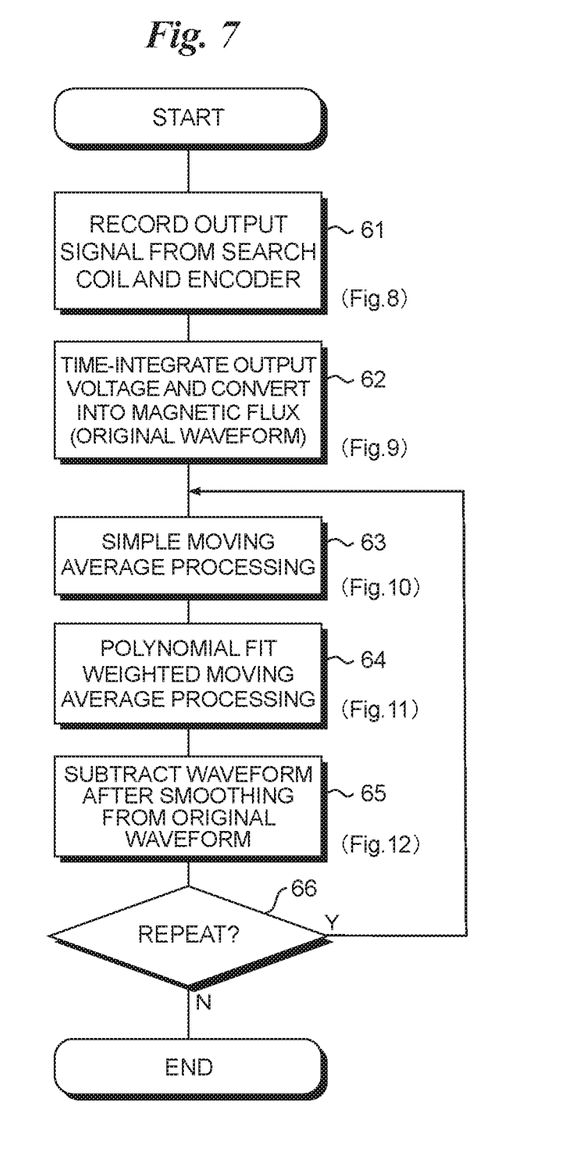
FIG. 7 is a flowchart showing a flow of processing of a signal processor.

FIG. 7 is a flowchart showing actions of the signal processor 90 that processes the signals outputted from the magnetic detector 10.

First, the range of the wire rope W to be inspected is determined, and the magnetic detector 10 is moved back and forth at least three times across the inspection range. As described above, the magnetizing directions in the inspection range become uniform. Signals outputted from the search coil 13 when the magnetic detector 10 is moved back and forth initially are not recorded (for example, destroyed).

After back and forth movements of the magnetic detector 10 are finished, inspection of the inspection range is started (recording of the output signals is started). The magnetic detector 10 is moved from one end to the other end of the inspection range along the wire rope W. The output signals from the search coil 13 and the rotary encoder 52 are given to the signal processor 90 and recorded in a memory provided in the signal processor 90 (Step 61).

Figure 8:
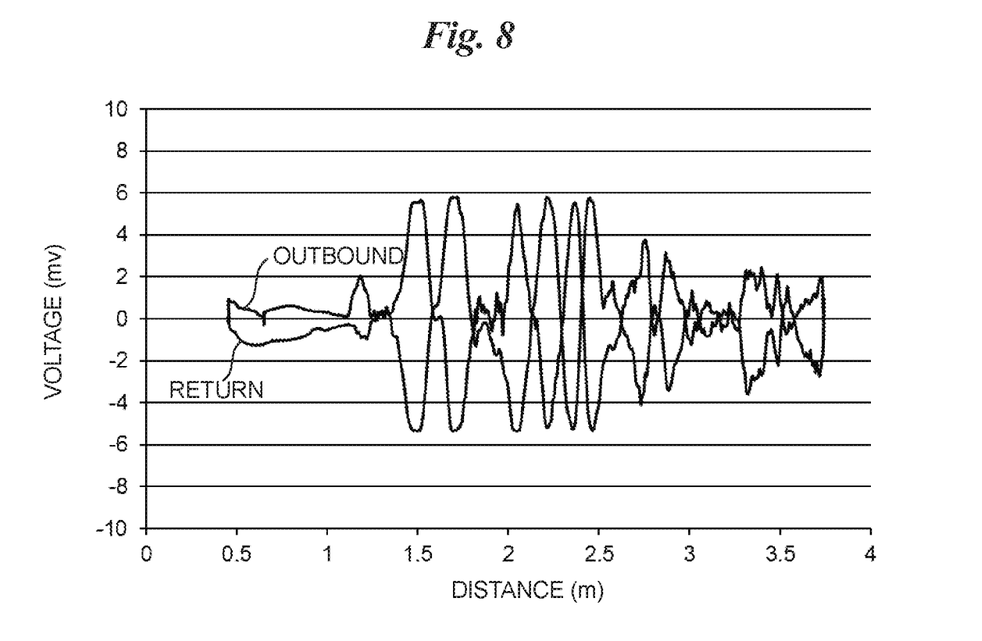
FIG. 8 shows voltage waveforms outputted from a search coil.

A graph of FIG. 8 shows waveforms representing a change in the output signals (voltage values) of the search coil 13 when the magnetic detector 10 is moved back and forth once across a predetermined inspection range.

As described above, when damage is present in the wire rope W, a change in the magnetic flux due to the change in the cross sectional area occurs, and electromotive force is generated in the search coil 13. The graph of FIG. 8 shows both a waveform representing a change in voltage generated in the search coil 13 when the magnetic detector 10 (search coil 13) is moved from one end to the other end of the inspection range (outbound), and a waveform representing a change in voltage generated in the search coil 13 when the magnetic detector 10 is moved from the other end to one end of the inspection range (return). Since polarity of the voltage generated in the search coil 13 is reversed between the outbound move and the return move, substantially up-down symmetric waveforms are shown on the graph.

Since the wire rope W is made by twisting a strand which is made by twisting plural wires, spiral projections and recesses (unevenness) are formed on the front surface of the wire rope W. The change in the magnetic flux also occurs from the projections and recesses on the front surface of the wire rope W. Therefore, even in a part where no damage occurs in the wire rope W, the change in the voltage is detected.

In a case where damage is present in the wire rope W, peak values (noticeable voltage values) appear among the output signals from the search coil 13. When a degree of the damage is higher, a change amount of the cross sectional area of the wire rope (change amount of the magnetic flux) becomes larger, and hence the peak values become larger.

It is possible to judge occurrence of damage present in the wire rope W, and a degree and a place of the damage by using the output signals (voltage values) from the search coil 13 (graph of FIG. 8). However, values of the output signals from the search coil 13 are changed in accordance with moving speed of the magnetic detector 10.

Returning to FIG. 7, in order to cancel the moving speed of the magnetic detector 10, the signal processor 90 executes processing of time-integrating the output signals (voltage values) from the search coil 13 and converting into the magnetic flux (magnetic flux amounts) (step 62).

Figure 9:
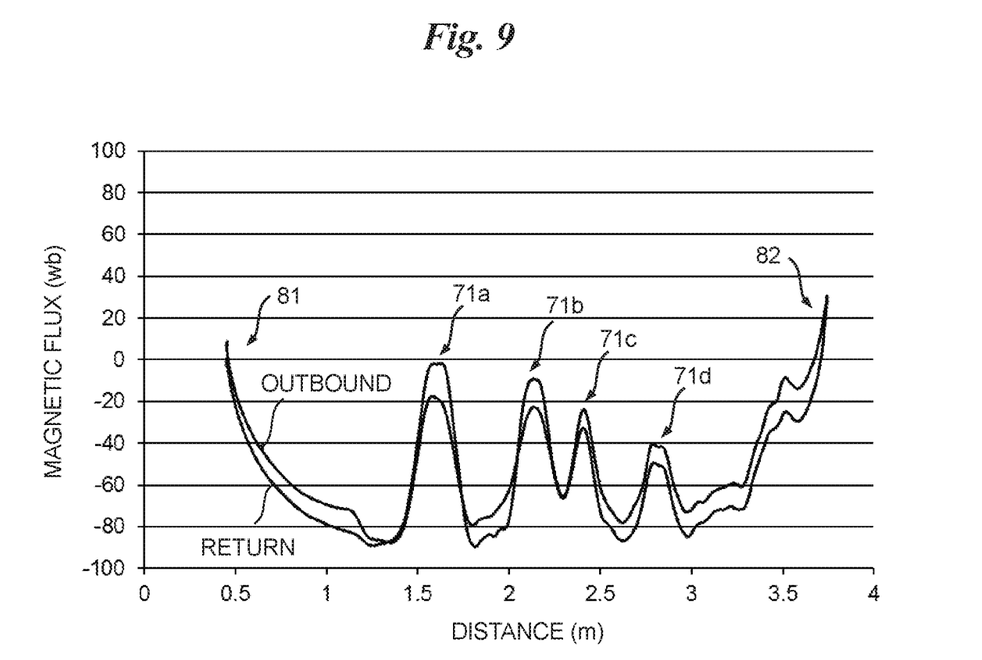
FIG. 9 shows waveforms of magnetic flux amounts.

FIG. 9 shows changes in the magnetic flux amounts obtained by time-integrating changes in the voltage values shown in FIG. 8. The vertical axis of the graph indicates the magnetic flux (Wb) (changes in the magnetic flux).

It is found that both left and right ends 81, 82 of waveforms shown in FIG. 9 stand up largely. As described above, this appears in a case where the wire rope W is magnetized in the longitudinal direction upon receiving the influence of earth magnetism during or after manufacture and magnetic poles are formed in both the end portions of the wire rope W. That is, stand-up of both the left and right ends 81, 82 of the waveforms shown in FIG. 9 does not represent the magnetic flux detected due to presence of the damage in the wire rope W but is so-called noise signals appearing in a case where the magnetic poles are formed in both the end portions of the wire rope W.

Four peaks 71a, 71b, 71c, 71d are observed in a range excluding both the left and right ends 81, 82 of the waveforms shown in FIG. 9. These peaks 71a to 71d appear in the waveforms due to the presence of the damage in the wire rope W. The higher the degree of the damage is, the larger these peaks become.

When the occurrence and the degree of the damage are judged by utilizing the waveforms of the magnetic flux amounts shown in FIG. 9, for example, by using threshold values, there is a possibility that the stand-up of both the left and right ends 81, 82 is judged as damaged parts. Thus, in the signal processor 90, correction processing shown below is performed.

Figure 10:
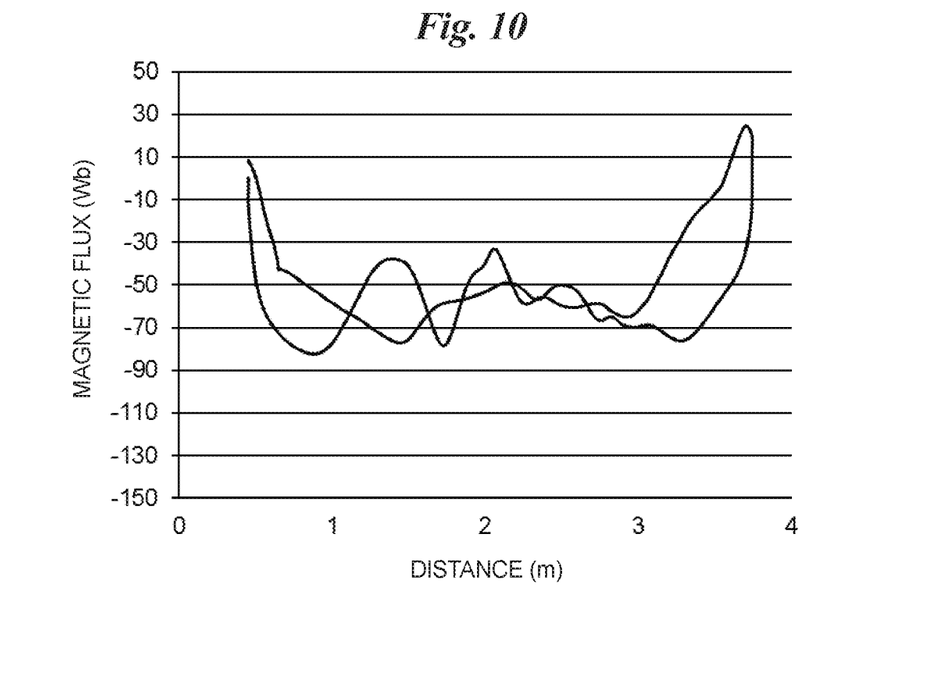
FIG. 10 shows waveforms of magnetic flux amounts after simple moving average

Returning to FIG. 7, first, simple moving average processing is performed (step 63). Regarding a section where a moving average is calculated, given that sampling is performed for every 1 ms, for example, the section is about 10 ms. FIG. 10 shows waveforms smoothed by performing the simple moving average processing on the waveforms of the magnetic flux amounts shown in FIG. 9.

Figure 11:
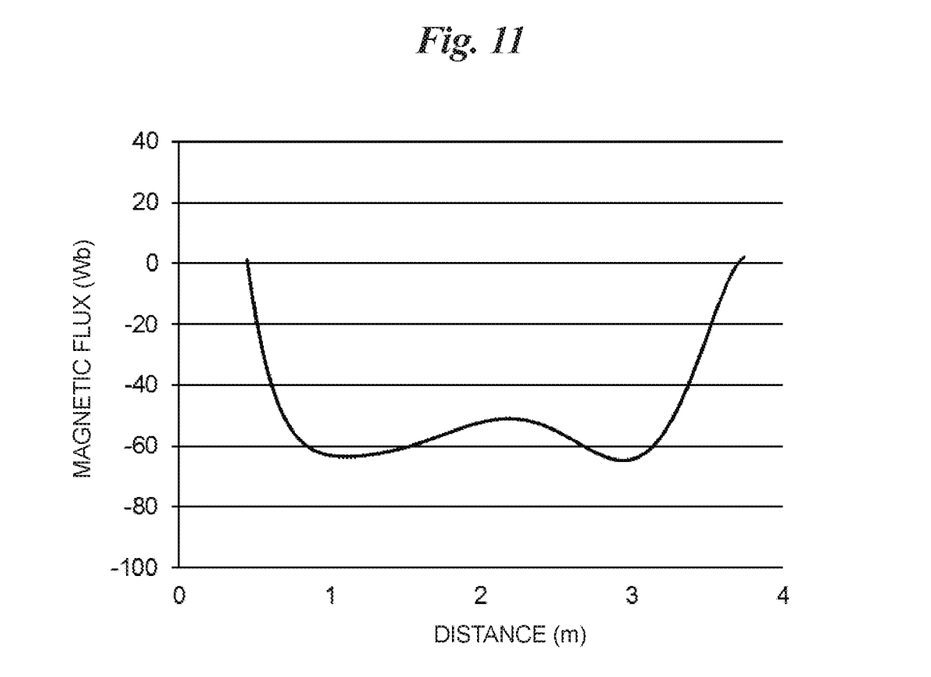
FIG. 11 shows waveforms of magnetic flux amounts after polynomial fit weighted moving average.

Next, polynomials of waveforms approximating the moving average waveforms are calculated and polynomial fit weighted moving average processing is performed (step 64). This is also processing for smoothing. For example, by using the least squares method, coefficients of seventh-order approximation formula are calculated. FIG. 11 shows waveforms smoothed by performing seventh-order polynomial fit weighted moving average processing on the waveforms after the simple moving average processing shown in FIG. 10.

Figure 12:
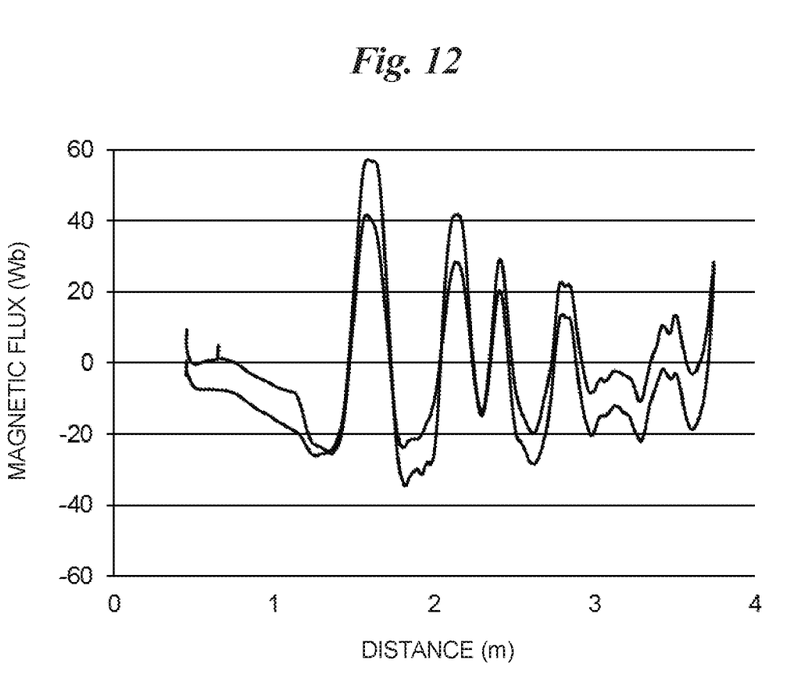
FIG. 12 shows waveforms of magnetic flux amounts after correction.

Finally, the waveforms of the magnetic flux amounts after smoothing (FIG. 11) are subtracted from the waveforms of the original magnetic flux amounts (FIG. 9), and thereby, the waveforms of the magnetic flux amounts are corrected (step 65). FIG. 12 shows waveforms of magnetic flux amounts after correction processing.

It is found that regarding the waveforms of the magnetic flux amounts after the correction processing, the large stand-up in both the ends is considerably smaller than the waveforms of the original magnetic flux amounts (FIG. 9).

If required, the correction processing described above, that is, the simple moving average processing, the polynomial fit weighted moving average processing, and the subtraction processing are repeated (YES in step 66). In subtraction processing for the second time or later, the waveforms of the magnetic flux amounts after the correction processing calculated in the previous processing are subtracted. By repeating the correction processing, the stand-up of both the end parts can be further smaller.

In the waveforms of the magnetic flux amounts after correction, noises of both the ends (waveform parts of the large stand-up) are removed and the damaged parts present in the wire rope W correspond to the peak values. That is, the S/N ratio of the waveforms of the magnetic flux amounts (output signals) is improved by the correction processing described above, and it is possible to more accurately detect the occurrence of the damage to the wire rope W, and the degree and the occurrence place of the damage. It is possible to acquire signals convenient for judging the occurrence of the damage, and the degree and the occurrence place of the damage by using the threshold values.

What is claimed is:

1. A signal processor comprising:
a voltage signal receiving device that receives an input of voltage signals corresponding to the change in the cross sectional area of a wire rope, the voltage signals outputted from a search coil of a portable damage detection device which is provided so as to surround a part of the wire rope in the longitudinal direction over the entire circumference, the portable damage detection device including a magnetizing device that magnetizes the wire rope in the longitudinal direction, and the search coil that detects a change in the cross sectional area of the wire rope in an inspection range magnetized by the magnetizing device;
a converting device that converts the voltage signals received by the voltage signal receiving device into magnetic flux signals;
a smoothing device that smooths the magnetic flux signals converted by the converting device and calculates smoothed magnetic flux signals; and
a subtracting device that subtracts the smoothed magnetic flux signals from the magnetic flux signals.

2. The signal processor according to claim 1, wherein the smoothing device uses a moving average method.

3. A signal processing method comprising:
receiving, by a voltage signal receiving device, an input of voltage signals corresponding to the change in the cross sectional area of a wire rope, the voltage signals outputted from a search coil of a portable damage detection device which is provided so as to surround a part of the wire rope in the longitudinal direction over the entire circumference, the portable damage detection device including a magnetizing device that magnetizes the wire rope in the longitudinal direction, and the search coil that detects a change in the cross sectional area of the wire rope in an inspection range magnetized by the magnetizing device;
converting the received voltage signals into magnetic flux signals by a converting device;
calculating smoothed magnetic flux signals by smoothing the converted magnetic flux signals by a smoothing device; and
subtracting the smoothed magnetic flux signals from the magnetic flux signals by a subtracting device.

* * * * *